(12) United States Patent
Chuang (10) Patent No.: US 8,371,725 B2
(45) Date of Patent: Feb. 12, 2013

(54) SHAPED OPTICAL PRISM STRUCTURE

(75) Inventor: Ping-Han Chuang, New Taipei (TW)

(73) Assignee: Taiwan Network Computer & Electronic Co., Ltd., New Taipei (TW)

( * ) Notice: Subject to any disclaimer, the term of this patent is extended or adjusted under 35 U.S.C. 154(b) by 84 days.

(21) Appl. No.: 13/075,383

(22) Filed: Mar. 30, 2011

(65) Prior Publication Data

US 2011/0176314 A1   Jul. 21, 2011

Related U.S. Application Data

(63) Continuation-in-part of application No. 12/285,389, filed on Oct. 3, 2008, now abandoned.

(51) Int. Cl.
*F21V 13/04* (2006.01)

(52) U.S. Cl. ........ 362/327; 362/299; 362/300; 362/308; 362/311.06; 362/359

(58) Field of Classification Search ................... 362/551, 362/555, 297, 298, 299, 300, 301, 302, 303, 362/304, 305, 307, 308, 309, 311.01, 311.02, 362/311.06, 311.15, 326, 327, 328, 329, 362/339, 340, 346, 351, 359

See application file for complete search history.

(56) References Cited

U.S. PATENT DOCUMENTS

| 3,832,539 | A | * | 8/1974 | Oram | 362/293 |
|---|---|---|---|---|---|
| 4,536,828 | A | * | 8/1985 | Mori | 362/558 |
| 6,722,777 | B2 | * | 4/2004 | Erber | 362/518 |
| 6,807,369 | B1 | | 10/2004 | Tenmyo | |
| 7,207,705 | B2 | * | 4/2007 | Ishida | 362/517 |
| 7,273,305 | B2 | | 9/2007 | Fong | |
| 7,322,729 | B2 | * | 1/2008 | Nagabuchi | 362/551 |
| 7,740,366 | B2 | * | 6/2010 | Tetsuo et al. | 362/97.3 |

* cited by examiner

*Primary Examiner* — Alan Cariaso
(74) *Attorney, Agent, or Firm* — Guice Patents PLLC (57) ABSTRACT

A shaped optical prism structure for mounting on an upward light-outgoing surface of a street light or wall lamp to change the direction of light through about 360 o by means of a recessed flat incident surface, a recessed primary full-reflection surface and a curved light-distribution surface formed of a series of sloping surfaces and to enable the light to be projected onto the floor.

6 Claims, 10 Drawing Sheets

SHAPED OPTICAL PRISM STRUCTURE

This is a continuation in part application of applicant's U.S. patent application Ser. No. 12/285,389 filed Oct. 3, 2008 now abandoned.

BACKGROUND OF THE INVENTION

1. Field of the Invention

The present invention relates to optical prism design technology and more particularly, to a shaped optical prism structure, which is based on the principle that lights will fully reflected when their refraction angle/incident angle is greater than the critical angle of the medium, and practical for use in different lighting fixtures, such as street light or wall lamp, for enabling lamp emitted light to be projected onto a predetermined illumination area after having been fully reflected multiple times.

2. Description of the Related Art

Figure 3:
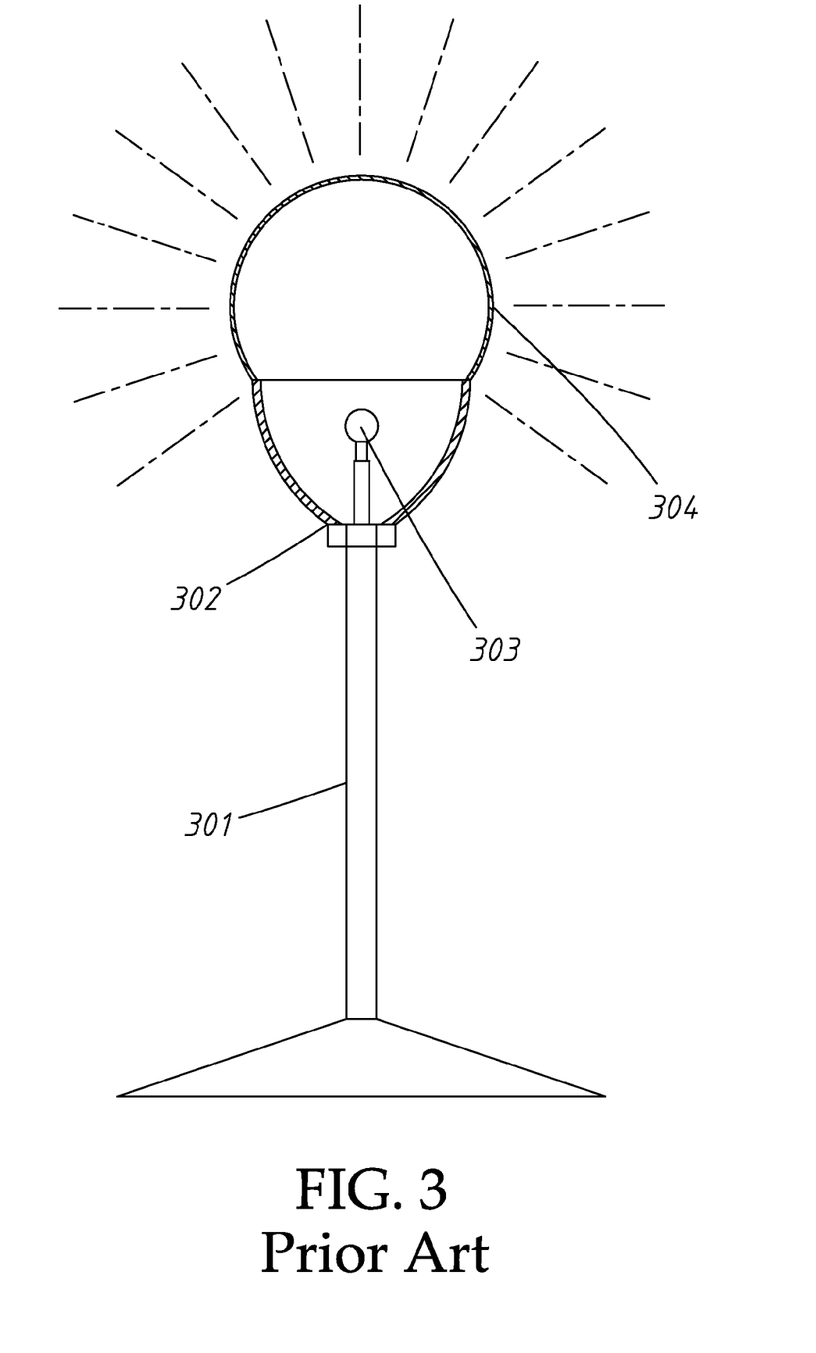
FIG. 3 is a schematic drawing illustrating the operation of a conventional street light.

A street or park light, as shown in FIG. 3, generally comprises a lamp post 301, a lamp 302 fixedly located on the top side of the lamp post 301 and holding a light source 303 therein and a light-permeable lampshade 304 surrounding the light-outgoing side of the lamp 302 for letting light rays to go in all directions. As the light-permeable lampshade 304 enables light rays to go in all directions, this design of street or park light achieves less road illumination effect and can cause light pollution.

Figure 4:
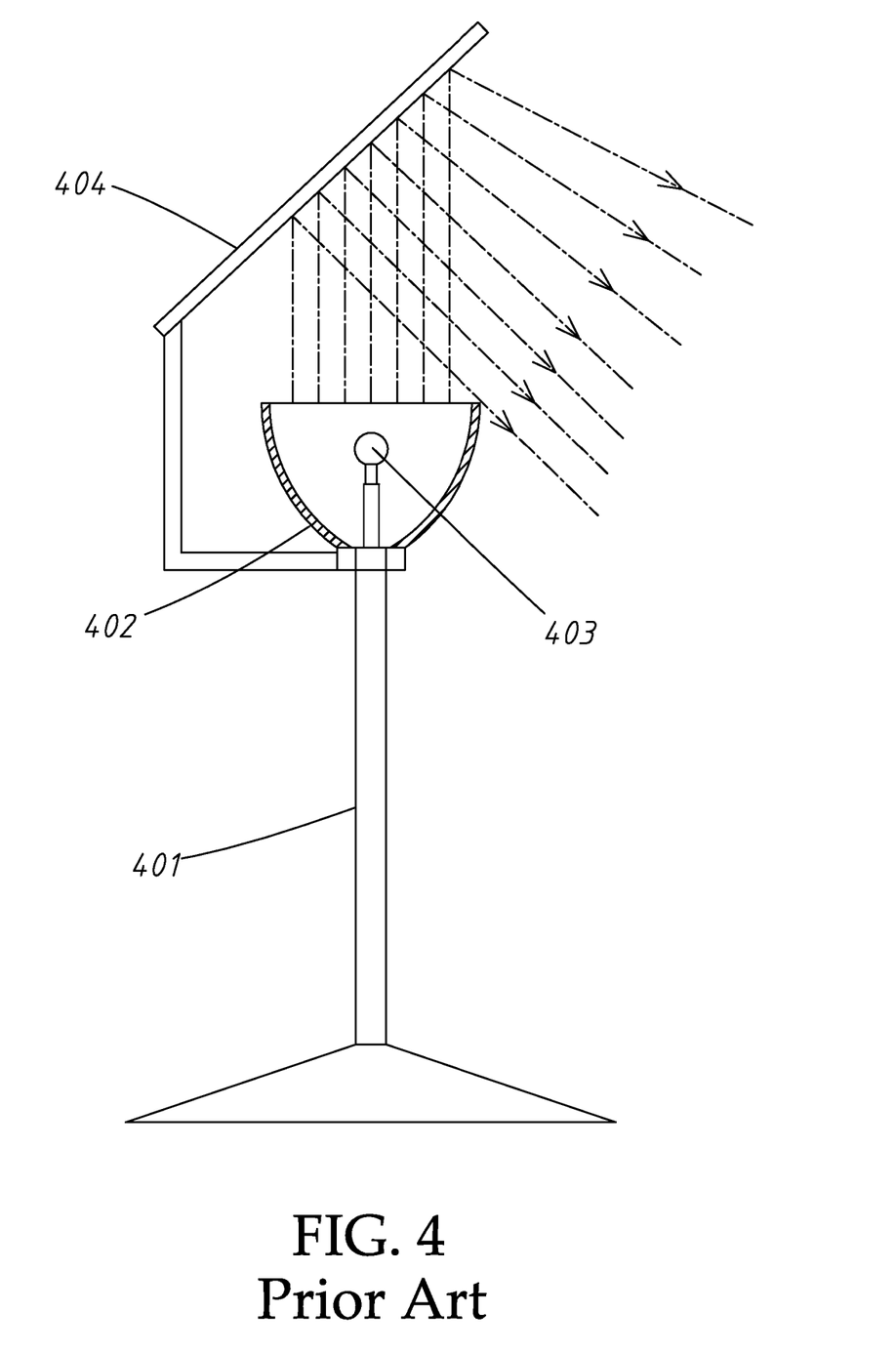
FIG. 4 is a schematic drawing illustrating a floor lamp with a reflective panel according to the prior art.

To avoid light pollution and glaze, an improved design of street light was created, as shown in FIG. 4. According to this design, the street light comprises a lamp post 401, a lamp 402 fixedly mounted on the top side of the lamp post 401 and holding therein a light source 403 having an upward light-outgoing surface, and a reflective panel 404 mounted on the lamp post 401 and suspending above the lamp 402 for reflecting emitted light toward the ground. This design of street light is still not satisfactory in function. The illumination range of this design of street light is limited. Further, after a long use, the reflective panel 404 tends to be covered with dust, lowering its reflective performance.

Figure 1:
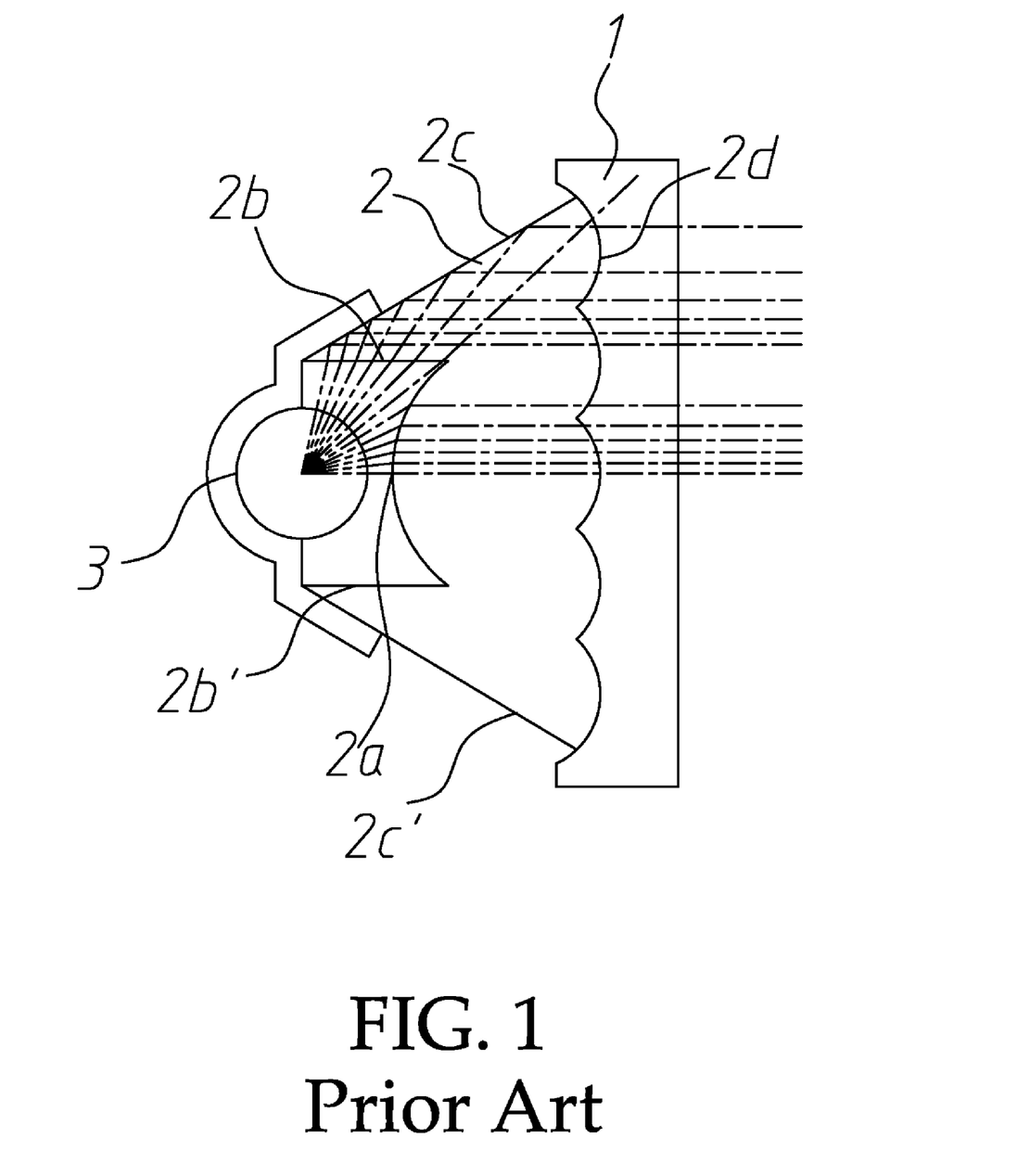
FIG. 1 is a schematic drawing illustrating an optical structure design according to the prior art.

U.S. Pat. No. 6,807,369 and U.S. Pat. No. 7,273,305 pertain to the same field relative to the present invention. According to the design of U.S. Pat. No. 6,807,369, as shown in FIG. 1, the illumination device includes a light distribution module consisting of a first optical member 2 and a second optical member 1. The first optical member 2 comprises a rounded incident surface 2a and two vertical incident surfaces 2b;2b' located on the bottom side thereof, two sloping reflective surfaces 2c;2c' located on the periphery, and a convex light-outgoing surface 2d located on the top side thereof. The first optical member 2 is adapted for focusing 360 o light rays emitted by a linear light source 3 onto an illumination area within the range of 90°. The second optical member 1 has a bottom incident surface provided with multiple recesses and a planar light-outgoing surface located on the top side thereof. The second optical member 1 is adapted for controlling distribution of light. After having been fully reflected once, light rays are refracted out of the light distribution module to illuminate a front area. This optical design is adapted for use in a lighting fixture for photographic apparatus, not suitable for street or part illumination.

Figure 2:
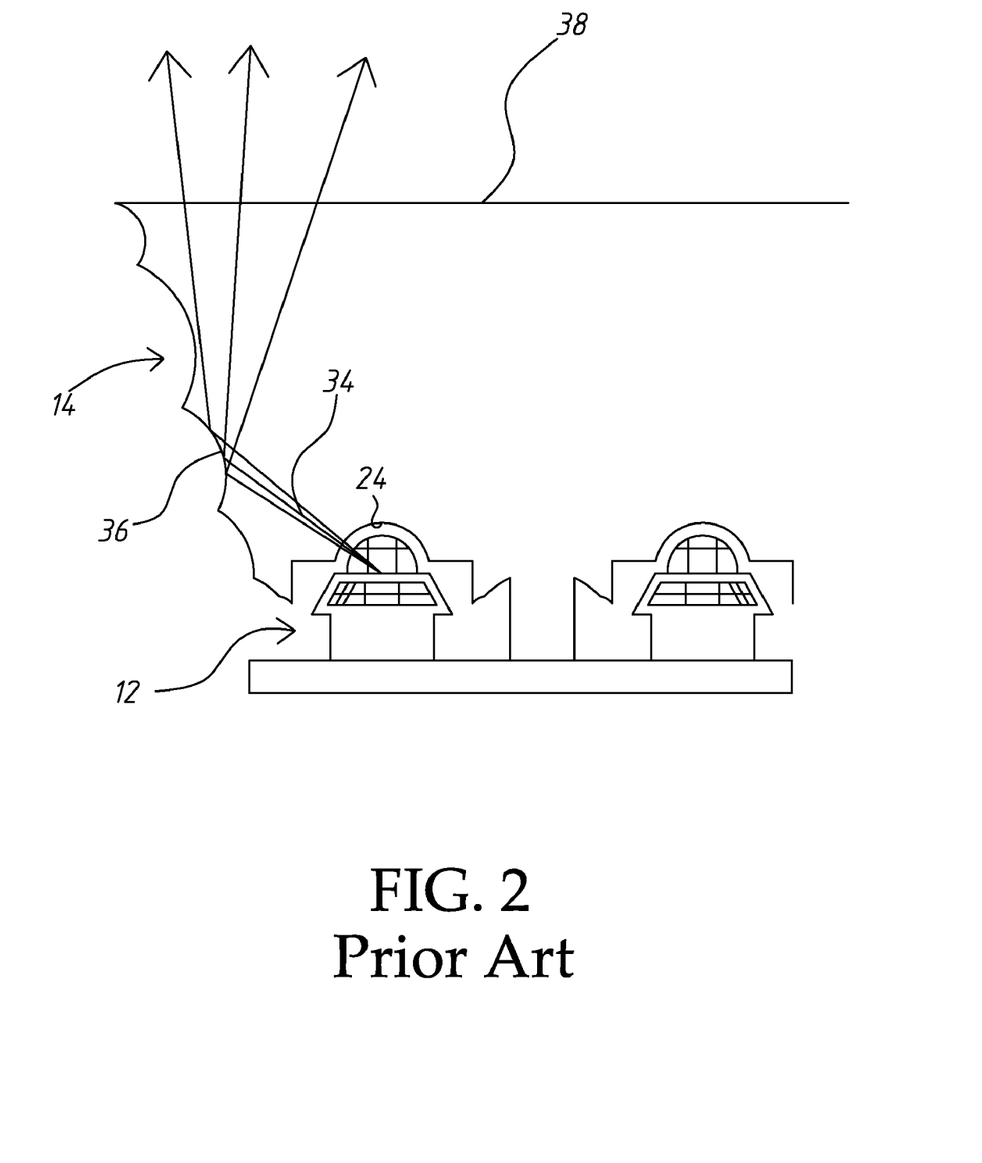
FIG. 2 is a schematic drawing illustrating another optical structure design according to the prior art.

U.S. Pat. No. 7,273,305 discloses a lighting device 14. The lighting device 14 comprises a plurality of incident surfaces 25 made in the form of a rounded recess and located on the bottom side thereof around a set of light sources 12, a plurality of arched reflective surfaces 36 at the periphery, and a planar light-outgoing surface 38 located on the top side. Light rays 34 emitted by the light sources 12 are fully reflected by the arched reflective surfaces 36 and then refracted out of the lighting device 14 by the planar light-outgoing surface 38. This design is especially suitable for automotive center-high-mounted-stop-light (CHMSL) and brake light applications.

SUMMARY OF THE INVENTION

The present invention has been accomplished under the circumstances in view. It is one object of the present invention to provide a shaped optical prism structure, which is based on the principle that lights will fully reflected when their refraction angle/incident angle is greater than the critical angle of the medium, and practical for use in different lighting fixtures, such as street light or wall lamp, for enabling the direction of incident light to be changed through about 360° so that light rays can be projected onto a predetermined illumination area after having been fully reflected at least two times.

To achieve this and other objects of the present invention, a shaped optical prism structure comprises an optical prism set horizontally in a perpendicular manner relative to a vertical line. The optical prism is arranged on a light-outgoing surface of a lamp that comprise a lampshade and at least one light source adapted for emitting light rays upwardly in a parallel manner out of the light-outgoing surface into the optical prism. In one embodiment of the present invention, the dimension and sloping angle of the optical prism are designed in a symmetric manner based on the vertical line. The optical prism comprises two recessed flat incident surfaces sloping inwardly and symmetrically from a center area of a bottom side thereof toward the vertical line, the size of each recessed flat incident surface, when projected onto a horizontal plane, being about one half of the size of the light-outgoing surface of the lamp, the combined size of the two recessed flat incident surfaces, when projected onto a horizontal plane, is equal to the size of the light-outgoing surface of the lamp, the recessed flat incident surface being defined to be the exclusive light incident surface of the optical prism; a light-outgoing surface connected to the border of the recessed flat incident surface and adapted for output of light rays out of the optical prism; a recessed primary full-reflection surface curved inwards from a top side thereof toward the vertical line and adapted for primarily and fully reflecting the incident light falling upon the recessed flat incident surface; and a curved light-distribution surface formed of a series of sloping surfaces at the periphery of the optical prism for fully reflecting incident light secondarily, the sloping surfaces sloping at different angles, each the sloping surface having a top side thereof connected with a top edge of the recessed primary full-reflection surface and a bottom side thereof connected with the light-outgoing surface, the sloping surfaces sloping from the topmost edge thereof toward the lowest point thereof in an outward manner away from the center line. The light rays emitted by the at least one light source enter the optical prism through the recessed flat incident surface and then primarily reflected by recessed primary full-reflection surface and secondarily reflected by the curved light-distribution surface and then refracted by the light-outgoing surface of the optical prism toward a predetermined area right below the lamp.

In another embodiment, the size and sloping angle of the optical prism are asymmetric relative to the vertical line.

DETAILED DESCRIPTION OF THE PREFERRED EMBODIMENT

Figure 5:
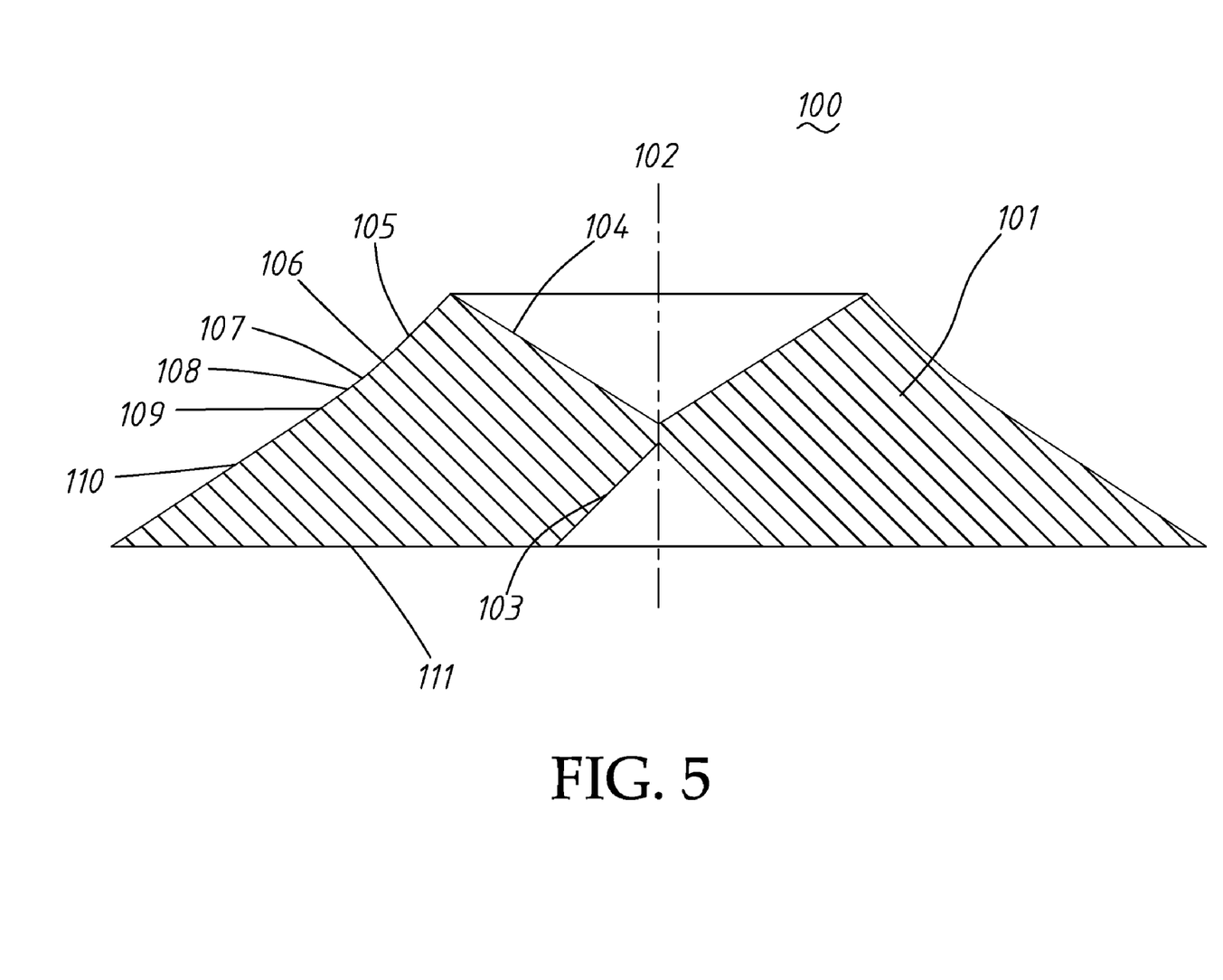
FIG. 5 is a schematic sectional view of a shaped optical prism structure in accordance with a first embodiment of the present invention.

Referring to FIG. 5, a shaped optical prism structure 100 in accordance with a first embodiment of the present invention is shown comprising an optical prism 101 prepared from transparent acrylic or glass and set horizontally in a perpendicular manner relative to a vertical line 102. The vertical line 102 in this embodiment is the center line so that the dimension and sloping angle of the optical prism 101 are designed in a symmetric manner based on the vertical line 102.

As illustrated in the left part of FIG. 5, the optical prism 101 comprise two recessed flat incident surfaces 103 sloping inwardly symmetrically from a center area of the bottom side thereof toward the vertical line 102. The size of each recessed flat incident surface 103, when projected onto a horizontal plane, is about one half of the size of the light-outgoing surface of the lamp to be used with the shaped optical prism structure 100. The combined size of the two symmetrical recessed flat incident surfaces 103, when projected onto a horizontal plane, is equal to the size of the light-outgoing surface of the lamp to be used with the shaped optical prism structure 100. Further, the recessed flat incident surfaces 103 are defined to be the only light incident surfaces of the optical prism 101. A light-outgoing surface 111 is connected to the recessed flat incident surfaces 103. This light-outgoing surface 111 is defined to be the light-outputting surface of the optical prism 101. The optical prism 101 further comprises a recessed primary full-reflection surface 104 curved inwards from the top side thereof toward the vertical line 102 and adapted for primarily and fully reflecting the incident light falling upon the optical prism 101. Further, the periphery of the optical prism 101 is formed of a series of sloping surfaces 105;106;107;108;109;110 that slope at different angles. These sloping surfaces 105;106;107;108;109;110 are connected together, forming a curved light-distribution surface that has its top side connected with the top edge of the recessed primary full-reflection surface 104 and its bottom side connected with the light-outgoing surface 111. Most of the sloping surfaces 105;106;107;108;109;110 slope from the top side toward the bottom side in an outward manner away from the center line. The curved light-distribution surface that is formed of the sloping surfaces 105;106;107;108;109;110 is defined to be a secondary full-reflection surface for secondarily and fully reflecting the incident light falling upon the optical prism 101.

Figure 6:
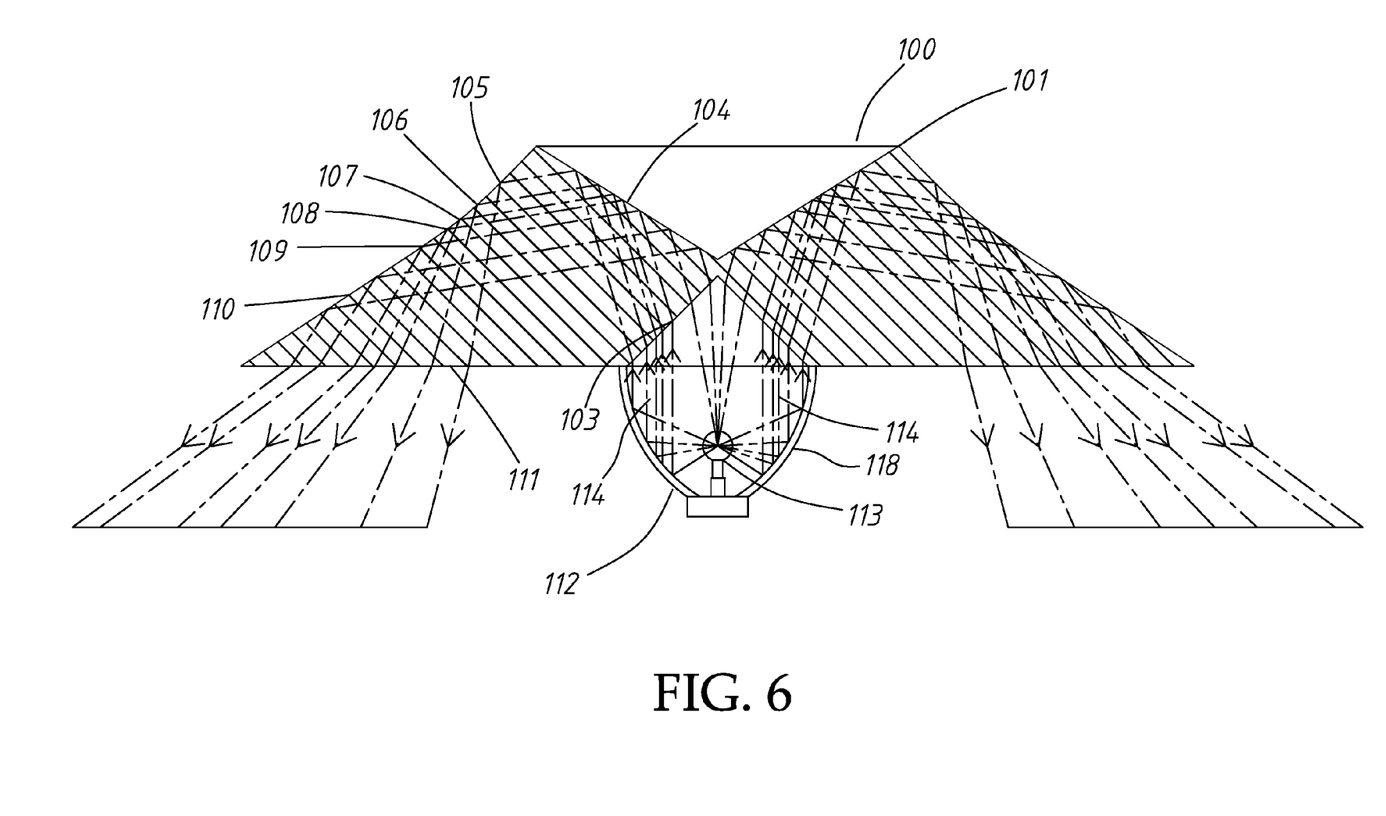
FIG. 6 is a schematic drawing illustrating the light path of light rays passed from a lamp and refracted and reflected by the optical prism structure in accordance with the first embodiment of the present invention.

FIG. 6 illustrates the light path of the light passed from the lamp through the shaped optical prism structure 100. As illustrated, the lamp, referenced by 112, comprises a lampshade 118 and a light source 113 surrounded by the lampshade 118. Light rays 114 go upwardly in a parallel manner toward the top light-outgoing surface of the lamp 112. The shaped optical prism structure 100 is located on the top light-outgoing surface of the lamp 112. When the light rays 114 fall upon the recessed flat incident surfaces 103 of the optical prism 101, most light rays will be refracted toward the inside of the optical prism 101 at one same angle. When light rays reach the inner side of the recessed primary full-reflection surface 104 of the optical prism 101, they will not be refracted toward the outside due their incident angle to be greater than the critical angle of the optical prism 101 and will be reflected toward the periphery of the optical prism 101 at one same angle. When these fully-reflected light rays reach the inner side of the curved light-distribution surface formed of the sloping surfaces 105;106;107;108;109;110, they will not be refracted toward the outside due their incident angle to be greater than the critical angle of the optical prism 101 and will be reflected toward the bottom side of the optical prism 101 at the same angle relative to the incident angle, causing light rays to change their radiating direction at an angle greater than 270°. When light rays reach the light-outgoing surface 111 of the optical prism 101, their incident angle is smaller than the critical angle of the optical prism 101, and therefore these light rays are refracted out of the optical prism 101 by the light-outgoing surface 111.

Figure 7:
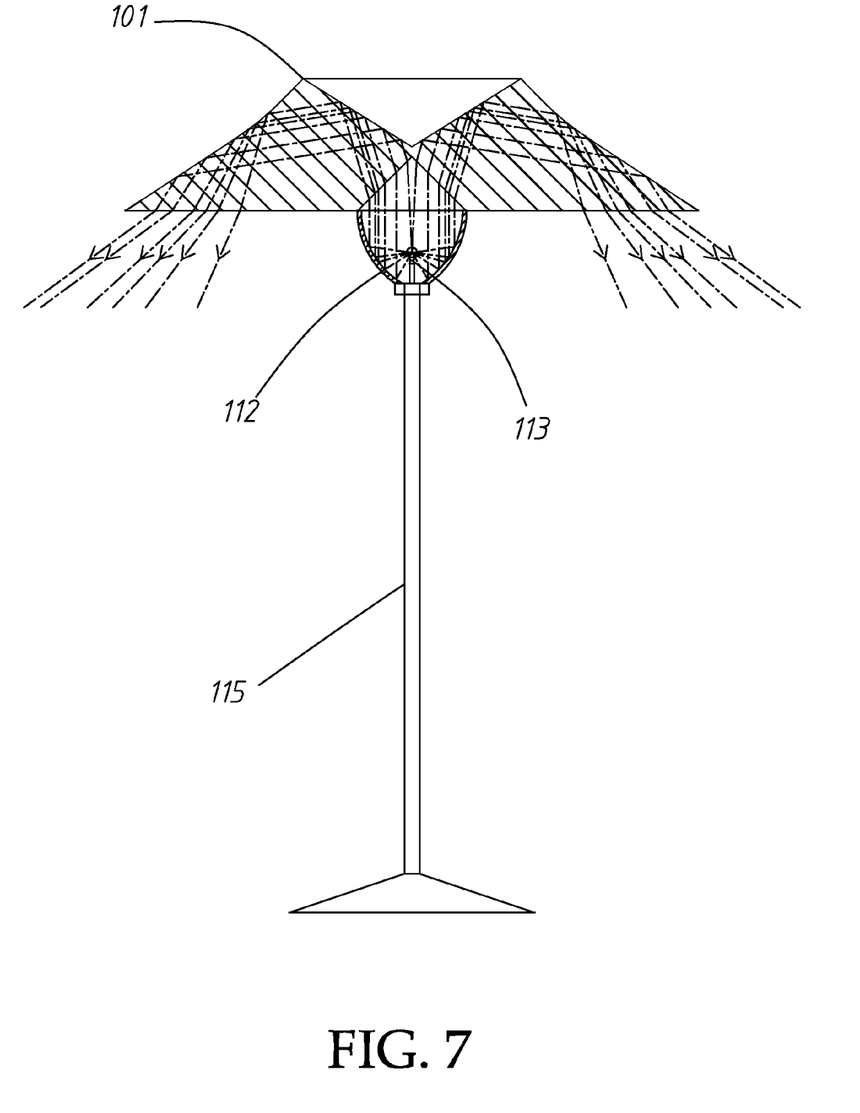
FIG. 7 is a schematic drawing illustrating an application example of the shaped optical prism structure in accordance with the first embodiment of the present invention.

FIG. 7 illustrates one application example of the present invention. As illustrated, the shaped optical prism structure is used with a floor lamp. The floor lamp comprises a lamp stand 115, and a lamp 112 located on the top side of the lamp stand 115 and carrying therein a light source 113 and having an upward light outgoing surface located on the top side thereof. The optical prism 101 is located on the top light-outgoing surface of the lamp 112. As described in FIG. 6, most light rays from the lamp 112 are refracted and reflected by the optical prism 101 to illuminate the floor area under the lamp. The lighting range is freely controllable.

Figure 8:
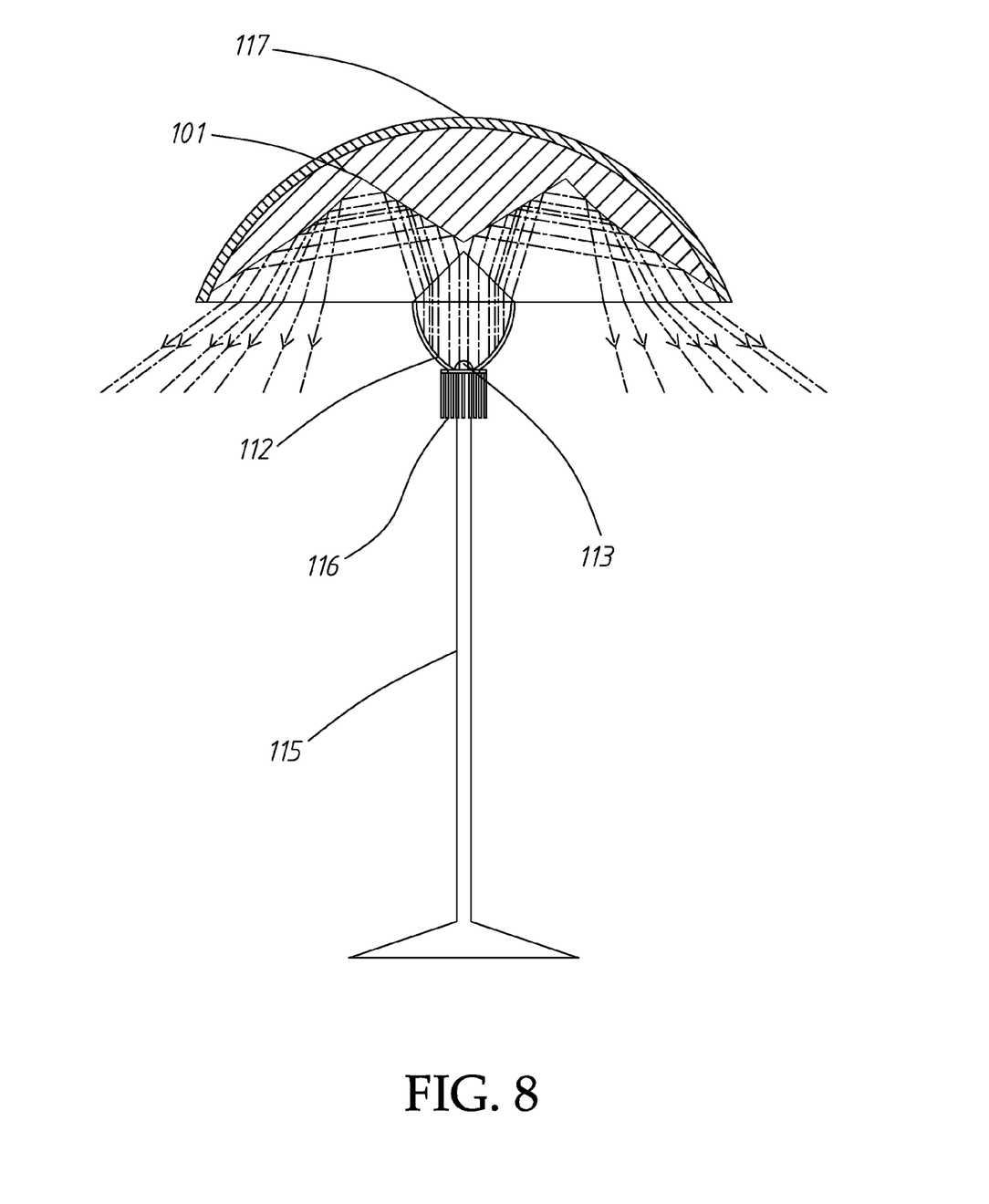
FIG. 8 is a schematic drawing illustrating another application example of the shaped optical prism structure in accordance with the first embodiment of the present invention.

FIG. 8 illustrates another application example of the present invention. As illustrated, the shaped optical prism structure is used with a floor lamp. The floor lamp comprises a lamp stand 115, a lamp 112 located on the top side of the lamp stand 115 and carrying therein a LED light source 113 and having an upward light outgoing surface located on the top side thereof, radiating fins 116 located on the bottom side of the lamp 112 and a lampshade 117 suspending above the lamp 112. The optical prism 101 is located on the top light-outgoing surface of the lamp 112 within the lampshade 117. Most light rays from the lamp 112 are refracted and reflected by the optical prism 101 to illuminate the floor area under the lamp.

Figure 9:
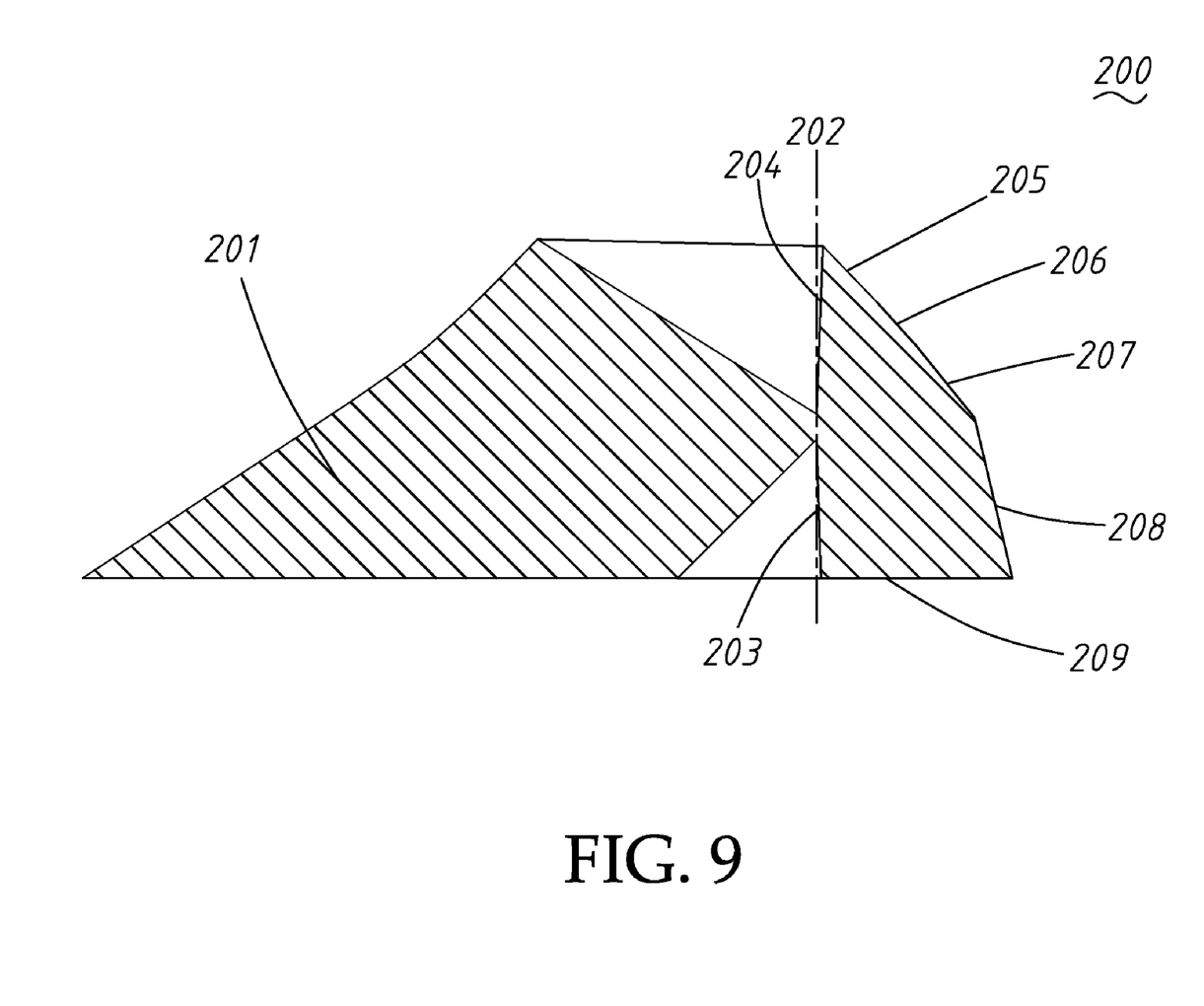
FIG. 9 is a schematic sectional view of a shaped optical prism structure in accordance with a second embodiment of the present invention.

FIG. 9 illustrates a shaped optical prism structure 200 in accordance with the present invention. As illustrated, the shaped optical prism structure 200 comprises an optical prism 201 that is configured subject to a vertical line 202. According to this embodiment, the dimension and sloping angle of the optical prism 101 are designed in an asymmetric manner based on the vertical line 202. The size and sloping angle of left half of the optical prism 201 are same as that of the embodiment shown in FIG. 5, however, the right half comprises a first recessed flat incident surface 203 curved inwardly from a center area of the bottom side thereof toward the vertical line 202. This first recessed flat incident surface 203 is defined to be another incident surface of the optical prism 201. A second incident surface 209 is connected to the border of the first recessed flat incident surface 203. This second incident surface 209 is defined to be yet another incident surface of the optical prism 201. The size of the first recessed flat incident surface 203 and the size of the second incident surface 209, when projected onto a horizontal plane, are about one half of the size of the light-outgoing surface of the lamp to be used with the shaped optical prism structure 200. The optical prism 201 further comprises a recessed flat refractive surface 204 curved inwards from the top side thereof toward the vertical line 102. This recessed flat refractive surface 204 is adapted for refracting a part of incident light toward the outside of the optical prism 201. The periphery of the optical prism 201 is formed of a series of sloping surfaces 205;206;207;208 that slope at different angles. These sloping surfaces 205;206;207;208 are connected together, forming a curved light-distribution surface that has its top side connected with the top edge of the recessed flat refractive surface 204 and its bottom side connected with the second incident surface 209. Most of the sloping surfaces 205;206;207;208 slope from the top side toward the bottom side in an outward manner away from the vertical line 202. These sloping surfaces 205;206;207;208 are adapted for fully reflecting a part of incident light.

Figure 10:
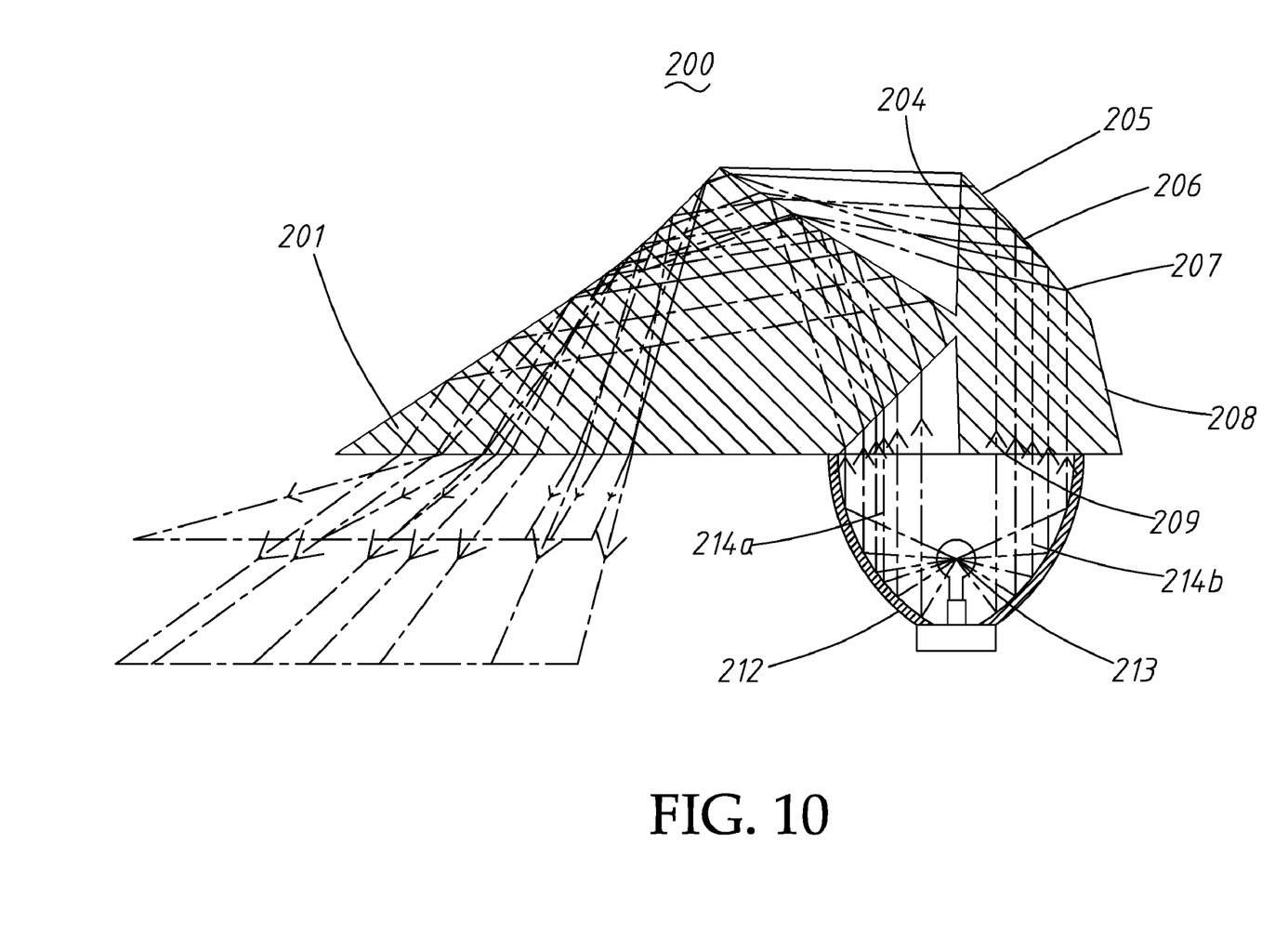
FIG. 10 is a schematic drawing illustrating the light path of light rays passed from a lamp and refracted and reflected by the optical prism structure in accordance with the second embodiment of the present invention.

FIG. 10 illustrates the light path of the light passed from the lamp through the shaped optical prism structure 200. As illustrated, the lamp, referenced by 212, has mounted therein a light source 213. The optical prism 201 is located on the light-outgoing surface. Most light rays 214a came from the left half of the lamp 20 enter the left half of the optical prism 201 and then go in the same manner as described in FIG. 6. Light rays 214b came from the right half of the lamp 20 enter the second incident surface 209 at the bottom side of the right half of the optical prism 201. The light rays than fall upon the second incident surface 209 perpendicularly will not be reflected and will directly go to the sloping surfaces 205;206; 207;208. When light rays reach the sloping surfaces 205;206; 207;208, the incident angle of these light rays is greater than the critical angle of the optical prism 201, and therefore these light rays are fully reflected toward the left half of the optical prism 201 at an angle of reflection same as their incident angle. When light rays are reflected onto the recessed flat refractive surface 204, the incident angle is smaller than the critical angle of the optical prism 201, and therefore these light rays are refracted into the inside of the optical prism 201 and finally refracted by the bottom surface of the left half of the optical prism 201 toward the predetermined illumination area. In this embodiment, the shaped optical prism structure 200 enables the major part of the emitted light of the lamp 212 to be projected onto a predetermined illumination area at the left side relative to the lamp. Thus, this embodiment is practical for wall lamp application, enhancing the illumination performance of the lamp.

The design of the shaped optical prism structure in accordance with the present invention is based on the principle that lights will fully reflected when their refraction angle/incident angle is greater than the critical angle of the medium. The shaped optical prism can be used in different lighting fixtures, such as street light or wall lamp, for enabling emitted light to be projected onto a predetermined illumination area after having been fully reflected at least two times. When using the shaped optical prism structure in a street light or landscape lighting fixture, the street light or landscape lighting fixture can be installed to emit light upward, enabling the direction of most light rays to be changed through about 360° toward the ground. The optical principle used in the present invention is quite different from that used in the two cited prior art designs. More particularly, the optical prism used in the present invention show significant differences in structure and purpose when compared to the two cited prior art designs.

When compare the first embodiment of the present invention with U.S. Pat. No. 6,807,369 shown in FIG. 1 and U.S. Pat. No. 7,273,305 shown in FIG. 2, the shaped optical prism structure 100 shows a significant structural different. The shaped optical prism structure 100 enables the light emitted by the light source to be fully reflected by the recessed primary full-reflection surface 104 at the first time and fully reflected by the curved light-distribution surface of the series of sloping surfaces 105;106;107;108;109;110 at the second time, and then finally refracted by the light-outgoing surface 111 onto the area tight blow the lamp. Further, the design of U.S. Pat. No. 6,807,369 is adapted for use in a lighting fixture for photographic apparatus; the design of U.S. Pat. No. 7,273, 305 is adapted for use in a lighting fixture for motor vehicle. Unlike the purposes of the cited references, the invention is adapted for street light or wall lamp application.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A shaped optical prism structure, comprising an optical prism set horizontally in a perpendicular manner relative to a vertical line, said optical prism being arranged on a light-outgoing surface of a lamp, said lamp comprising a lampshade and at least one light source adapted for emitting light rays upwardly in a parallel manner out of said light-outgoing surface into said optical prism, a dimension and sloping angle of said optical prism being designed in a symmetric manner based on said vertical line, wherein said optical prism comprises:

two recessed flat incident surfaces of a cross section of said optical prism sloping inwardly and symmetrically from a center area of a bottom side thereof toward said vertical line, a size of each said recessed flat incident surface, when projected onto a horizontal plane, being about one half of the size of said light-outgoing surface of said lamp, the combined size of said two recessed flat incident surfaces, when projected onto a horizontal plane, being equal to the size of said light-outgoing surface of said lamp, said recessed flat incident surfaces being defined to be the light incident surfaces of said optical prism;

a light-outgoing surface connected to said recessed flat incident surfaces and adapted for output of light rays out of said optical prism;

two recessed primary full-reflection surfaces of the cross section of said optical prism sloping inwards from a top side thereof toward said vertical line and adapted for primarily and fully reflecting the incident light falling upon said recessed flat incident surfaces; and a curved light-distribution surface formed of a series of sloping surfaces at the periphery of said optical prism for fully reflecting incident light secondarily, said sloping surfaces sloping at different angles, said curved light-distribution surface having a top side thereof connected with a top edge of said two recessed primary full-reflection surfaces and a bottom side thereof connected with said light-outgoing surface, said sloping surfaces of said curved light-distribution surface sloping from the top side of said curved light-distribution surface toward the bottom side of said curved light-distribution surface in an outward manner away from a center line of said optical prism; and wherein light rays emitted by said at least one light source enter said optical prism through said two recessed flat incident surfaces and then are primarily reflected by said two recessed primary full-reflection surfaces and secondarily reflected by said curved light-distribution surface and then refracted by the light-outgoing surface of said optical prism toward a predetermined area right below said lamp.

2. The shaped optical prism structure as claimed in claim 1, wherein said optical prism is prepared by a transparent acrylic material.

3. The shaped optical prism structure as claimed in claim 1, wherein said optical prism is prepared by a transparent glass material.

4. A shaped optical prism structure, comprising an optical prism set horizontally in a perpendicular manner relative to a vertical line, said optical prism being arranged on a light-outgoing surface of a lamp, said lamp comprising a lampshade and at least one light source adapted for emitting light rays upwardly in a parallel manner out of said light-outgoing surface into said optical prism, a dimension and sloping angle of said optical prism being designed in a non-symmetrical manner based on said vertical line, wherein said optical prism comprises:

a left half at a left side relative to said vertical line, said left half comprising:
  a recessed flat incident surface of a cross section of said optical prism sloping inwardly from a center area of a bottom side thereof toward said vertical line, a size of said recessed flat incident surface, when projected onto a horizontal plane, being about one half of the size of said light-outgoing surface of said lamp;
  a light-outgoing surface connected to the border of said recessed flat incident surface and adapted for output of light rays out of said optical prism;
  a recessed primary full-reflection surface of the cross section of said optical prism sloping inwards from a top side thereof toward said vertical line and adapted for primarily and fully reflecting the incident light falling upon said recessed flat incident surface; and
  a curved light-distribution surface formed of a series of sloping surfaces at the periphery of said optical prism for fully reflecting incident light secondarily, said sloping surfaces sloping at different angles, said curved light-distribution surface having a top side thereof connected with a top edge of said recessed primary full-reflection surface and a bottom side thereof connected with said light-outgoing surface, said sloping surfaces of said curved light-distribution surface sloping from the top side of said curved light-distribution surface toward the bottom side thereof in an outward manner away from a center line of said optical prism;

wherein light rays emitted by a left part of said at least one light source enter said optical prism through said recessed flat incident surface and then primarily reflected by recessed primary full-reflection surface and secondarily reflected by said curved light-distribution surface and then refracted by the light-outgoing surface of said optical prism toward a predetermined area right below said lamp; and a right half at a right side relative to said vertical line, said right half comprising:
  a first recessed flat incident surface sloping inwardly from a center area of a bottom side thereof toward said vertical line for input of light rays from said at least one light source;
  a second incident surface connected to the border of said first recessed flat incident surface, a size of said first recessed flat incident surface and said second incident surface, when projected onto a horizontal plane, being about one half of the size of the light-outgoing surface of said lamp;
  a recessed flat refractive surface curved inwards from the top side of said right half toward said vertical line and adapted for refracting a part of incident light toward the outside of said optical prism; and
  a curved light-distribution surface formed of a series of sloping surfaces at the periphery of said right half and sloping at different angles, the curved light-distribution surface of said right half having the topmost edge thereof connected with the topmost edge of said recessed flat refractive surface and the lowest edge thereof connected with said second incident surface, sloping surfaces of the curved light-distribution surface of said right half sloping from the topmost edge toward the lowest edge in an outward manner away from said vertical line for fully reflecting incident light; and wherein light rays emitted by a right part of said at least one light source enter said optical prism through said second incident surface perpendicularly and then are primarily and fully reflected by the curved light-distribution surface of said right half in a perpendicular manner toward said recessed flat refractive surface and refracted by said recessed flat refractive surface onto said recessed primary full-reflection surface and secondarily reflected by said curved light-distribution surface of said left half and finally refracted by the light-outgoing surface of said left half toward the predetermined area right below said lamp.

5. The shaped optical prism structure as claimed in claim 4, wherein said optical prism is prepared by a transparent acrylic material.

6. The shaped optical prism structure as claimed in claim 4, wherein said optical prism is prepared by a transparent glass material.

* * * * *